No. 608,026. Patented July 26, 1898.
H. E. BRYANT.
ROLL HOLDING CAMERA.
(Application filed Jan. 13, 1897.)

(Model.) 2 Sheets—Sheet 1.

WITNESSES:
G. E. Thompson
A. M. Tuttle

INVENTOR
Henry E. Bryant
BY C. B. Tuttle
ATTORNEY.

No. 608,026. Patented July 26, 1898.
H. E. BRYANT.
ROLL HOLDING CAMERA.
(Application filed Jan. 13, 1897.)
(Model.) 2 Sheets—Sheet 2.
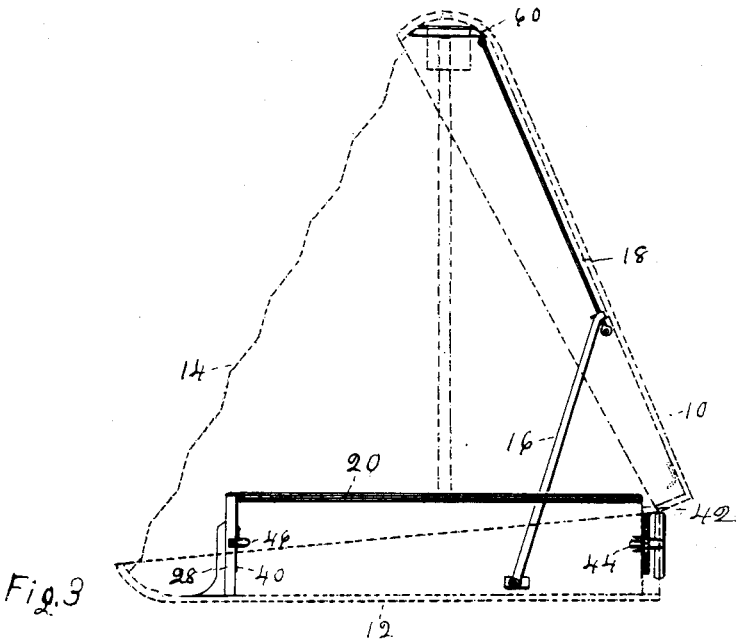
Fig. 3
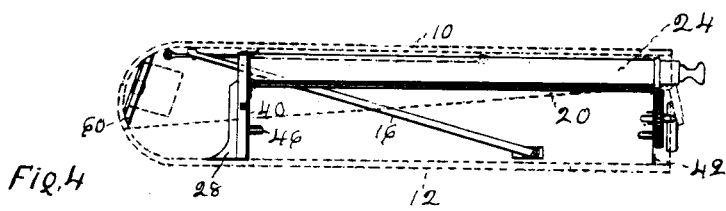
Fig. 4
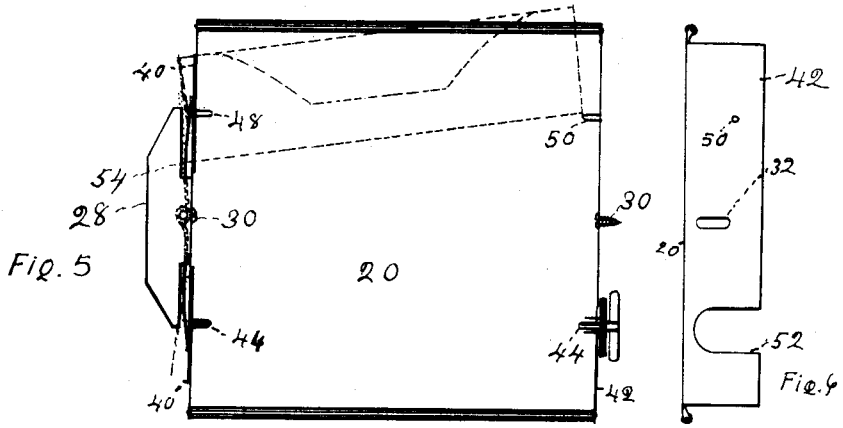
Fig. 5
Fig. 4
WITNESSES:
G. E. Thompson
A. M. Tuttle
INVENTOR
Henry E. Bryant
BY C. B. Tuttle
ATTORNEY.

UNITED STATES PATENT OFFICE.

HENRY E. BRYANT, OF BOSTON, MASSACHUSETTS.

ROLL-HOLDING CAMERA.

SPECIFICATION forming part of Letters Patent No. 608,026, dated July 26, 1898.

Application filed January 13, 1897. Serial No. 619,055. (Model.)

*To all whom it may concern:*

Be it known that I, HENRY E. BRYANT, of Boston, in the county of Suffolk and Commonwealth of Massachusetts, have invented certain Improvements in Photographic Cameras, of which the following, read in connection with the accompanying drawings, is a specification.

This invention relates to improvements in that class of photographic cameras which are designed to be carried about in the pocket or otherwise, and to that end require to be folded within a small compass.

Figure 1:
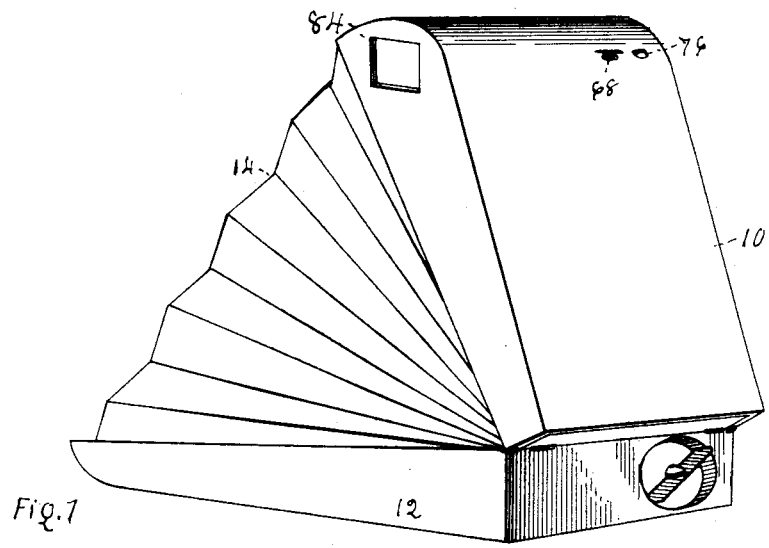
Figure 2:
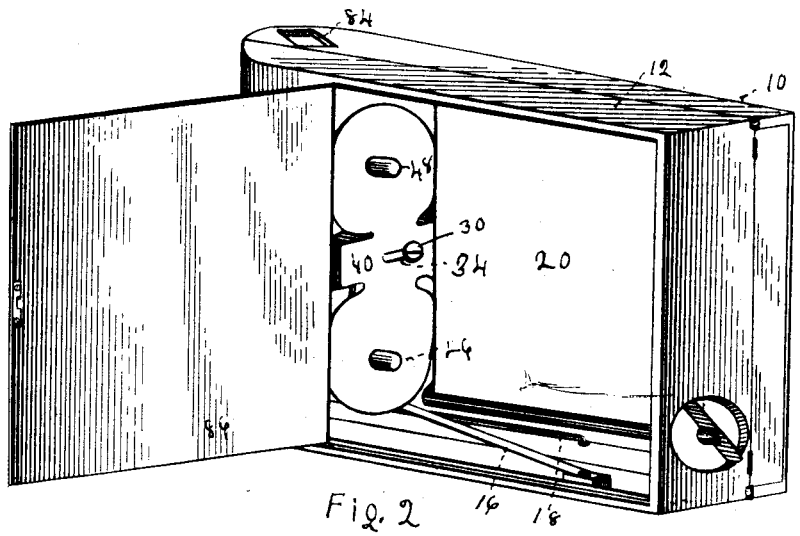

In the drawings, Figure 1 is a perspective view showing the camera opened. Fig. 2 is also a perspective view showing the camera closed, the door through which the film-rolls are introduced being opened. Fig. 3 is a side elevation of the camera opened, the outer casing or framework being indicated by dotted lines, the interior mechanism being shown in full lines. Fig. 4 is a similar view of the same parts with the camera closed and containing an independent plate-holding device. Fig. 5 is a plan view of the film-supporting platen and connections removed. Fig. 6 is a rear end elevation of Fig. 5.

In carrying out my invention the camera box or casing is made in two parts 10 12. By a hinged connection at the rear ends thereof said parts are held together, and movement thereof is permitted for swinging the free ends of said parts one from the other in order to open the camera-box for use, as shown by Figs. 1 and 3. Between said parts a folding bellows 14, of light-excluding material, is arranged for excluding light in the usual manner. Said parts are supported in open position by a bar 16. Said bar has one end in pivotal connection with the part 12 and has its other end in sliding connection with a rod 18, attached to the part 10, this being in order to permit the movement required of said bar in folding the camera parts together, as shown in Fig. 4.

In the outer or free end of part 10 is located the obliquely-arranged lens and its shutter connections. This arrangement is an important feature of my invention. By it the lens is brought into focal position perpendicular to the film-supporting platen 20 by the simple operation of opening the camera, and it allows of the platen being securely and economically connected with the part 12.

In carrying out the arrangement of platen 20 within the chamber of part 12 I have had in mind to arrange for the introduction of an independent plate-holding device 24, Fig. 4. To this end I make the platen-supporting connections adjustable, whereby movement of the platen adjustably is allowed from the focal plane, as shown in Fig. 3, to a plane therebelow, whereupon the independent plate-holding device 24, of usual construction for holding glass plates, may be introduced through a suitable opening at the back of the camera part 10 and rest upon the platen 20, all as shown in Fig 4.

The platen 20 is formed of sheet metal with roller connections supported at the sides thereof in the usual manner. At the front and back ends of the platen and integral therewith are downwardly-extending plate projections 40 42, formed by overturning and projecting downwardly the platen metal. Said plates are made to bear in sliding connection one with the inner face of the back wall of part 12 and the other against the face of supporting-block 28, and thereby are held in place by screws 30. Said screws being located in oblong slots 32 34 have only to be loosened in order to permit the platen being moved to different planes of altitude below the focal plane.

Supported for movement rotatively in the rear end of part 12 is the stud 44, on which to support one end of a film-holding roll, and has winding connections to engage the spool at that end. On the plate 40 is a stud 46, whereby to support the other end of said winding-spool. The spool from which the sensitized material is taken or unwound is supported on the studs 48 50. The film being made to pass over the platen 20 is thereby supported in the focal plane. To permit the described adjustment of the platen 20, plate 42 has the oblong recess 52, allowing for the winding-stud 44. The plate 40 is cut away from the platen 20, except at the central part thereof, as shown in Fig. 2, in order that the end portions thereof may be sprung outwardly, (indicated by dotted lines, Fig. 5,) and thus permit introduction and removal of the film-holding spools. The normal tension of said parts in springing back to place operates against the end faces of said spools and gives a tension thereto for holding the film tightly drawn. For ordinary purposes this tension is sufficient; but I have provided a spring 54 in support with the part 28 and bearing with its ends against the plate 40, as shown in Fig. 5. The supporting-block 28 will be understood as having a fixed connection with the frame part 12.

60 is a block for supporting the lens and shutter devices, and 76, Fig. 1, indicates a shutter-releasing push-button, and 68 is a shutter-setting device.

In connection with the lens an ordinary finder 84 is employed.

I claim—

1. The combination with an inclosing box formed of two halves or sections hinged together at their rear ends to open and shut, and a light-excluding bellows connecting the sides and front ends of the two box-sections, means located within one box-section for supporting a sensitized surface, and a lens mounted within the free front end of the other section and adapted when the box-sections are swung apart to be brought into proper focal relation to the said supporting means, substantially as described.

2. The combination of, a two-part camera-box having a hinged connection at one end permitting free movement of the parts to open the same, a light-excluding bellows between the parts for excluding light therefrom when opened, mechanism including the platen, 20, and roll-supporting connections, for holding the sensitized film located in the chamber of one of said parts, and a lens for throwing the image upon the sensitized film, said lens being located obliquely in the free end of said other part, whereby when the lens-carrying box-section is swung out the proper distance from the platen-carrying section, the lens will lie in proper focal relation to the platen, substantially as described.

3. The combination of a two-part camera-box having a hinged connection at one end permitting free movements of the parts to open the same, a light-excluding bellows between the parts for excluding light therefrom when opened, mechanism including the platen, 20, and roll-supporting connections for holding the sensitized film, located in the chamber of one of said parts, the adjustable connections permitting displacement of the platen, 20, to make way for an independent plate-holding device, and a lens for throwing the image upon the sensitized material, said lens being located in the free end of said other part; substantially as described.

4. The combination with the inclosing box formed in two sections hinged together at their rear ends, to open and shut, and connected therebeyond by a light-excluding bellows, of a lens mounted in the front end of one box-section, a platen or holder for the sensitized surface mounted within the other box-section, and a bar pivoted to the inner side of one box-section and in sliding connection with the other box-section to brace the box-sections apart when the lens reaches its proper focal relation to the said sensitized surface, substantially as described.

5. The combination with the inclosing box formed of two sections hinged together at their rear ends to open and shut and a bellows connecting the sides and front end of the box-sections, of a lens mounted in the front end of one box-section, and a platen mounted within the other section and having parallel end flanges provided with roll-carrying pins or studs, one of said flanges being cut away to form springs and permit the pins or studs carried thereby to be sprung into and out of engagement with the film-rolls, substantially as described.

6. In a camera the combination with the platen 20 having parallel end flanges 40, 42, provided with roll-carrying pins or studs, the flange 40 being cut away to form springs for the pins or studs 48, of an auxiliary spring 54 bearing at its ends on the flange-springs, substantially as described.

7. The combination with the inclosing box formed of two sections hinged together at their rear ends to open and shut and a bellows closing the sides and front of the box when open, of a lens mounted in the front end of one box-section, and a platen mounted within the other box-section and having front and rear flanges provided with slots 32, adjusting-screws passed through said slots for raising and lowering the platen, roll-carrying pins or studs, one of which (44) extends through a slot 52 in one of said flanges and means for operating the stud 44 from the exterior of the box, substantially as described.

Signed at Lynn, Massachusetts, this 26th day of December, A. D. 1896.

HENRY E. BRYANT.

Witnesses:
C. B. TUTTLE,
A. M. TUTTLE.